(12) United States Patent
Smith et al.

(10) Patent No.: US 10,220,562 B2
(45) Date of Patent: Mar. 5, 2019

(54) PRESSURIZED PLURAL NESTED PREFORM ASSEMBLY AND METHOD OF MANUFACTURE

(71) Applicant: The Procter & Gamble Company, Cincinnati, OH (US)

(72) Inventors: Scott Edward Smith, Cincinnati, OH (US); Larry Leroy Huston, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 246 days.

(21) Appl. No.: 15/235,262

(22) Filed: Aug. 12, 2016

(65) Prior Publication Data

US 2018/0043603 A1 Feb. 15, 2018

(51) Int. Cl.
*B29C 49/22* (2006.01)
*B29C 49/42* (2006.01)
(Continued)

(52) U.S. Cl.
CPC .............. *B29C 49/22* (2013.01); *B29B 11/14* (2013.01); *B29C 49/06* (2013.01); *B29C 49/4252* (2013.01); *B65D 83/62* (2013.01); *B29B 2911/1408* (2013.01); *B29B 2911/1435* (2015.05); *B29B 2911/1442* (2013.01); *B29B 2911/14053* (2013.01); *B29B 2911/14066* (2013.01); *B29B 2911/14093* (2013.01); *B29B 2911/14331* (2015.05); *B29B 2911/14341* (2015.05); *B29B 2911/14343* (2015.05); *B29B 2911/14348* (2015.05); *B29B 2911/14351* (2015.05); *B29B 2911/14473* (2013.01); *B29B 2911/14486* (2013.01); *B29B 2911/14573* (2013.01); *B29C 49/0078* (2013.01); *B29C 49/0084* (2013.01); *B29C 49/10* (2013.01); *B29C 2049/021* (2013.01); *B29C 2049/024* (2013.01); *B29C 2049/225* (2013.01); *B29C 2049/227* (2013.01); *B29K 2021/003* (2013.01);
(Continued)

(58) Field of Classification Search
None
See application file for complete search history.

(56) References Cited

U.S. PATENT DOCUMENTS

| | | |
|---|---|---|
| 3,450,254 A | 6/1969 | Miles |
| RE30,093 E | 9/1979 | Burger |

(Continued)

FOREIGN PATENT DOCUMENTS

WO     WO 91/08099 A1     6/1991

OTHER PUBLICATIONS

PCT Search Report PCT/US2017/046391; dated Nov. 8, 2017; 17 Pages.

*Primary Examiner* — Monica A Huson
(74) *Attorney, Agent, or Firm* — Abbey A Lopez; Sarah M DeCristofaro

(57) ABSTRACT

A plural preform assembly having nested preforms with an inner preform and an outer preform. The preforms are sealably joined together, defining a volume between the preforms. Propellant is disposed in the volume between the preforms. The preforms are later blow molded to provide a bag in bottle, bottle in bottle or similar container. The propellant charge is already present when blow molded, preventing the need for a later propellant filling step.

16 Claims, 8 Drawing Sheets

(51) Int. Cl.
  *B29B 11/14*     (2006.01)
  *B29C 49/06*     (2006.01)
  *B65D 83/62*     (2006.01)
  *B29K 21/00*     (2006.01)
  *B29K 67/00*     (2006.01)
  *B29L 31/00*     (2006.01)
  *B29C 49/00*     (2006.01)
  *B29C 49/10*     (2006.01)
  *B29C 49/02*     (2006.01)
  *B29L 9/00*     (2006.01)

(52) U.S. Cl.
  CPC .............. *B29K 2067/003* (2013.01); *B29K 2995/0098* (2013.01); *B29L 2009/001* (2013.01); *B29L 2031/7142* (2013.01); *B29L 2031/7158* (2013.01)

(56) References Cited

U.S. PATENT DOCUMENTS

| | | |
|---|---|---|
| 4,330,066 A | 5/1982 | Berliner |
| 5,177,981 A * | 1/1993 | Haas .................. A47G 19/2288 62/1 |
| 6,254,820 B1 | 7/2001 | Cornell |
| 6,499,311 B2 | 12/2002 | Mahajan |
| 6,649,121 B1 | 11/2003 | Hamamoto et al. |
| 8,505,762 B2 | 8/2013 | Holbach et al. |
| 8,851,322 B2 | 10/2014 | Heineken |
| 9,162,372 B2 | 10/2015 | Van Hove et al. |
| 2011/0024450 A1 | 2/2011 | Maas et al. |
| 2011/0248035 A1 | 10/2011 | Peirsman et al. |
| 2012/0132607 A1 | 5/2012 | Landman et al. |
| 2014/0202975 A1 | 7/2014 | Tom et al. |
| 2015/0108163 A1 | 4/2015 | Smith et al. |
| 2015/0210524 A1 | 7/2015 | Witte et al. |

* cited by examiner

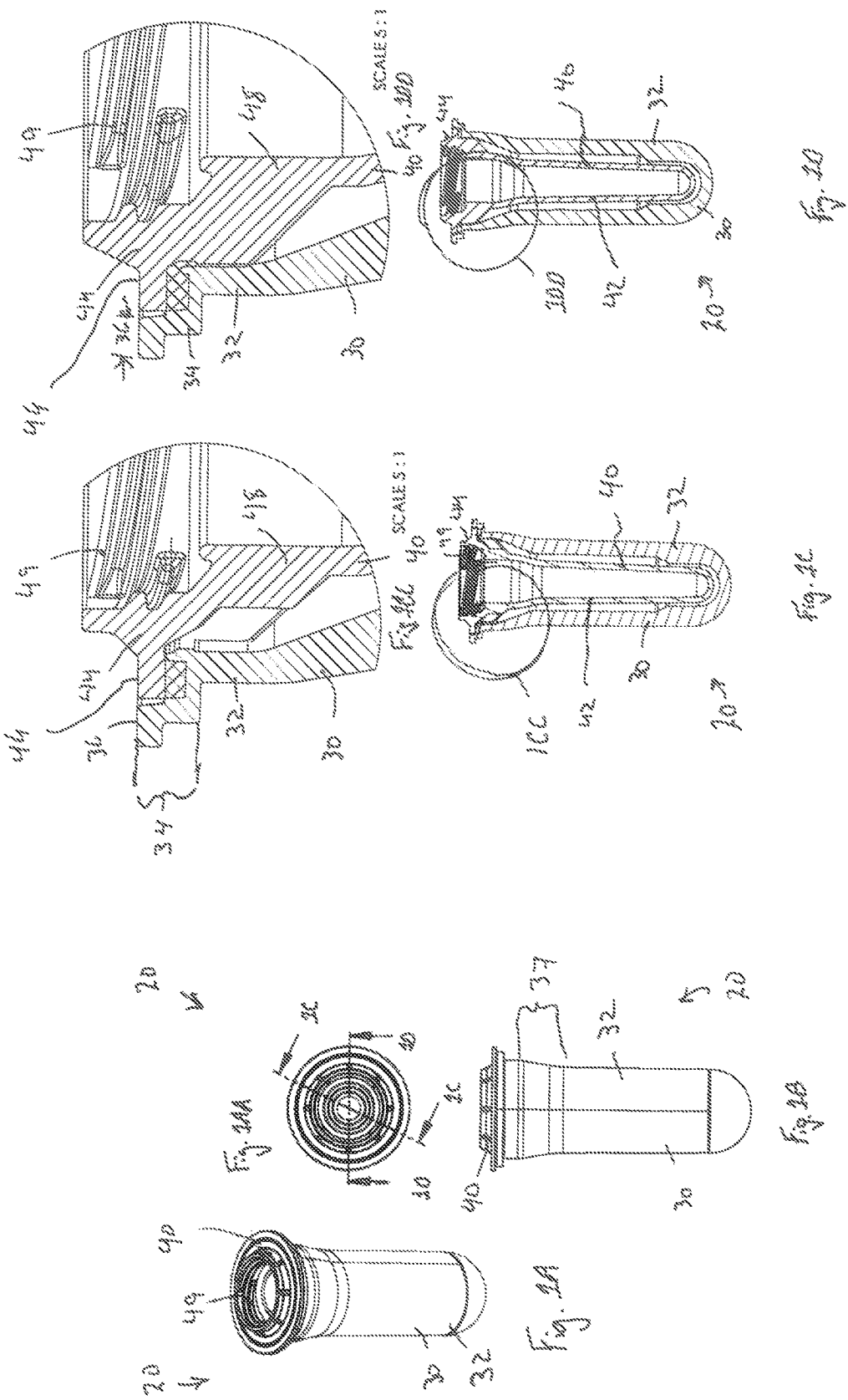

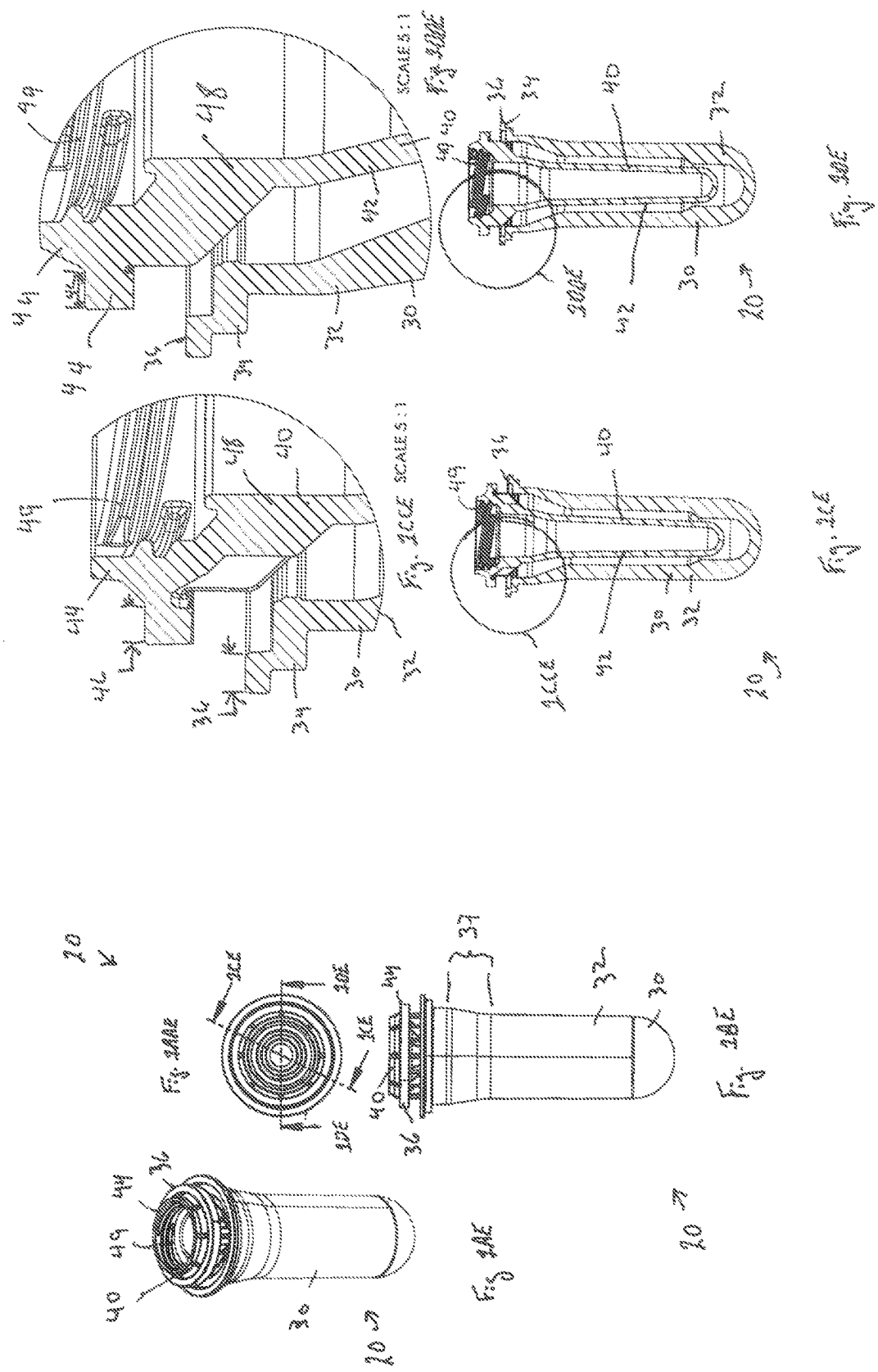

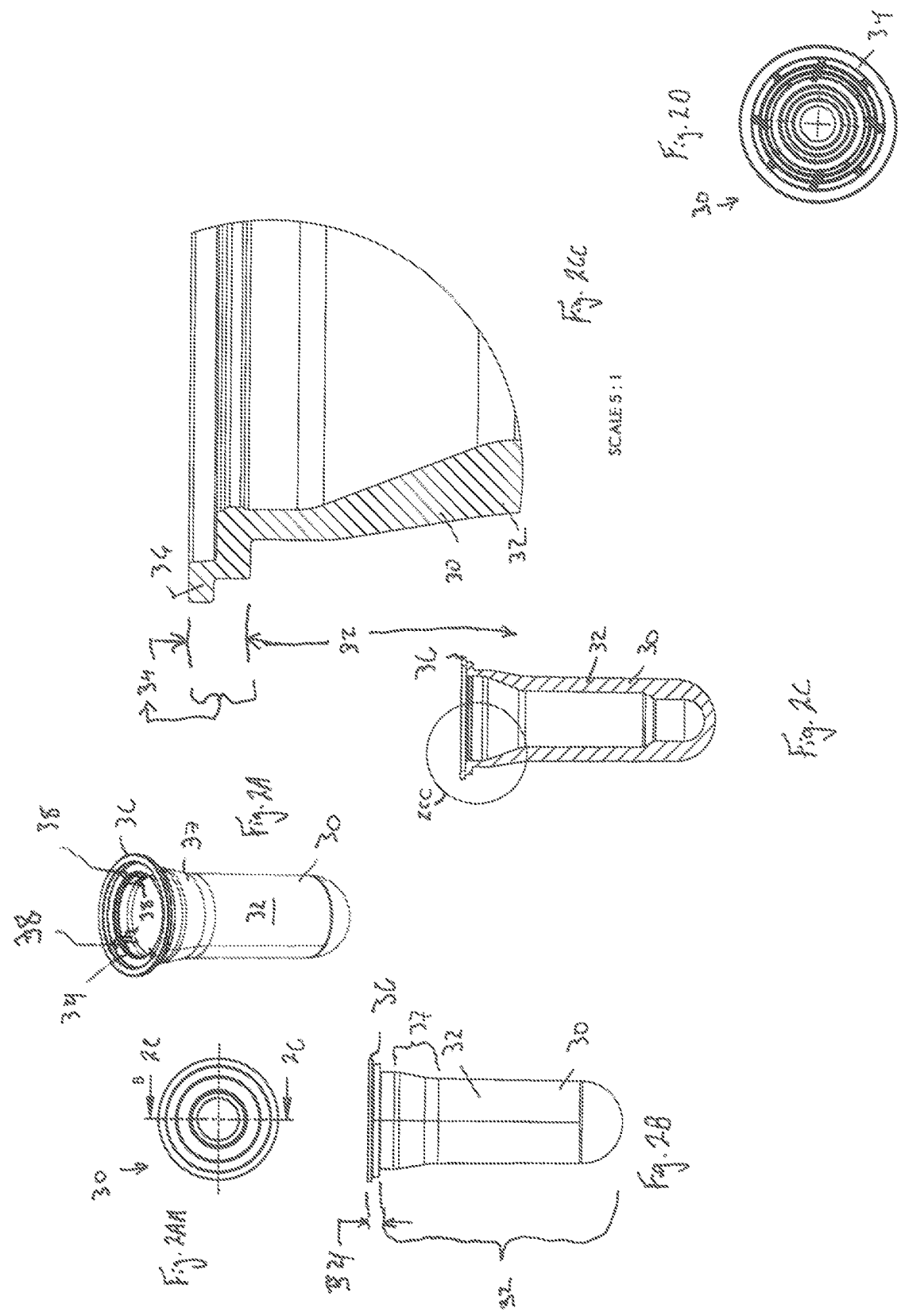

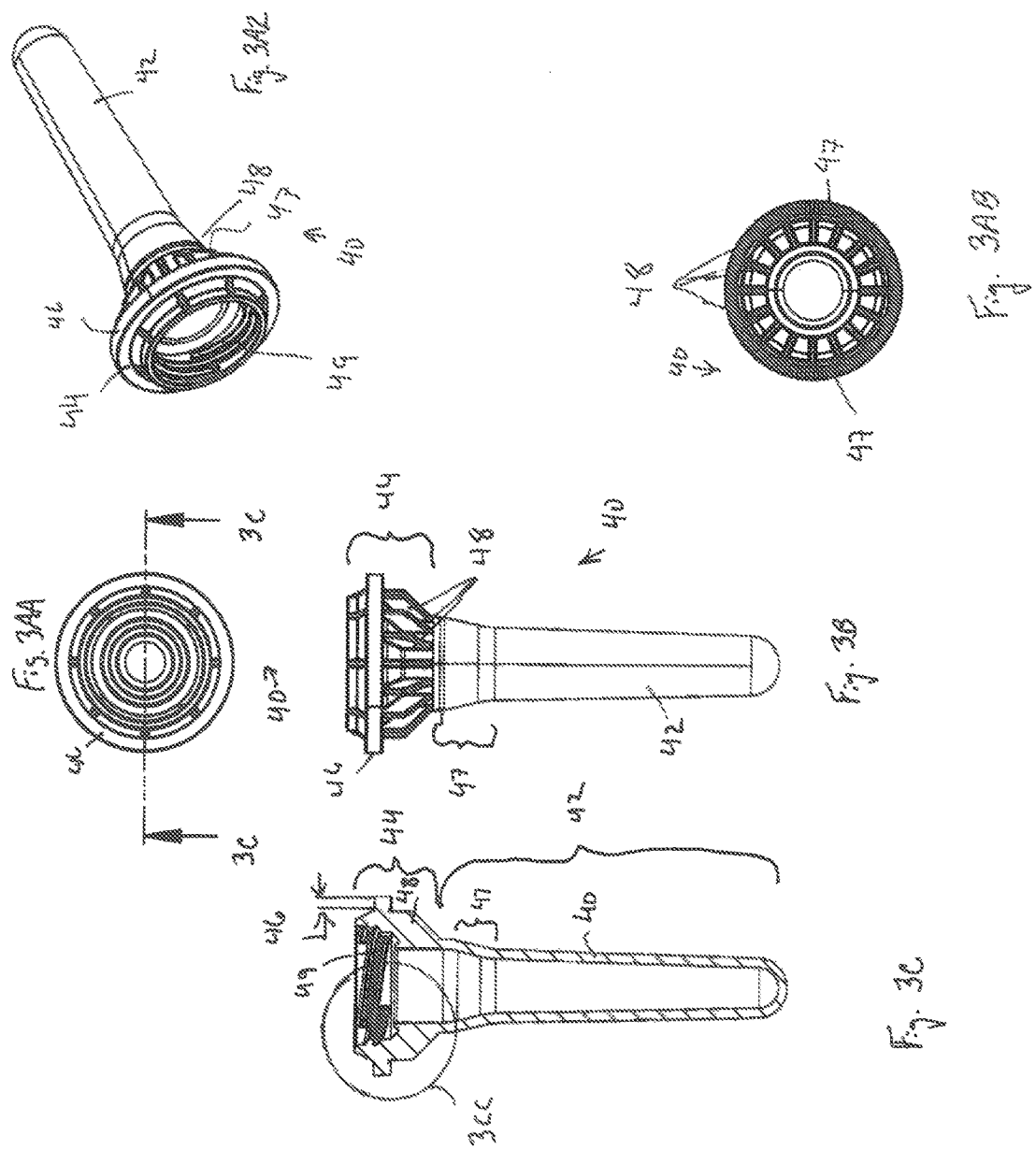

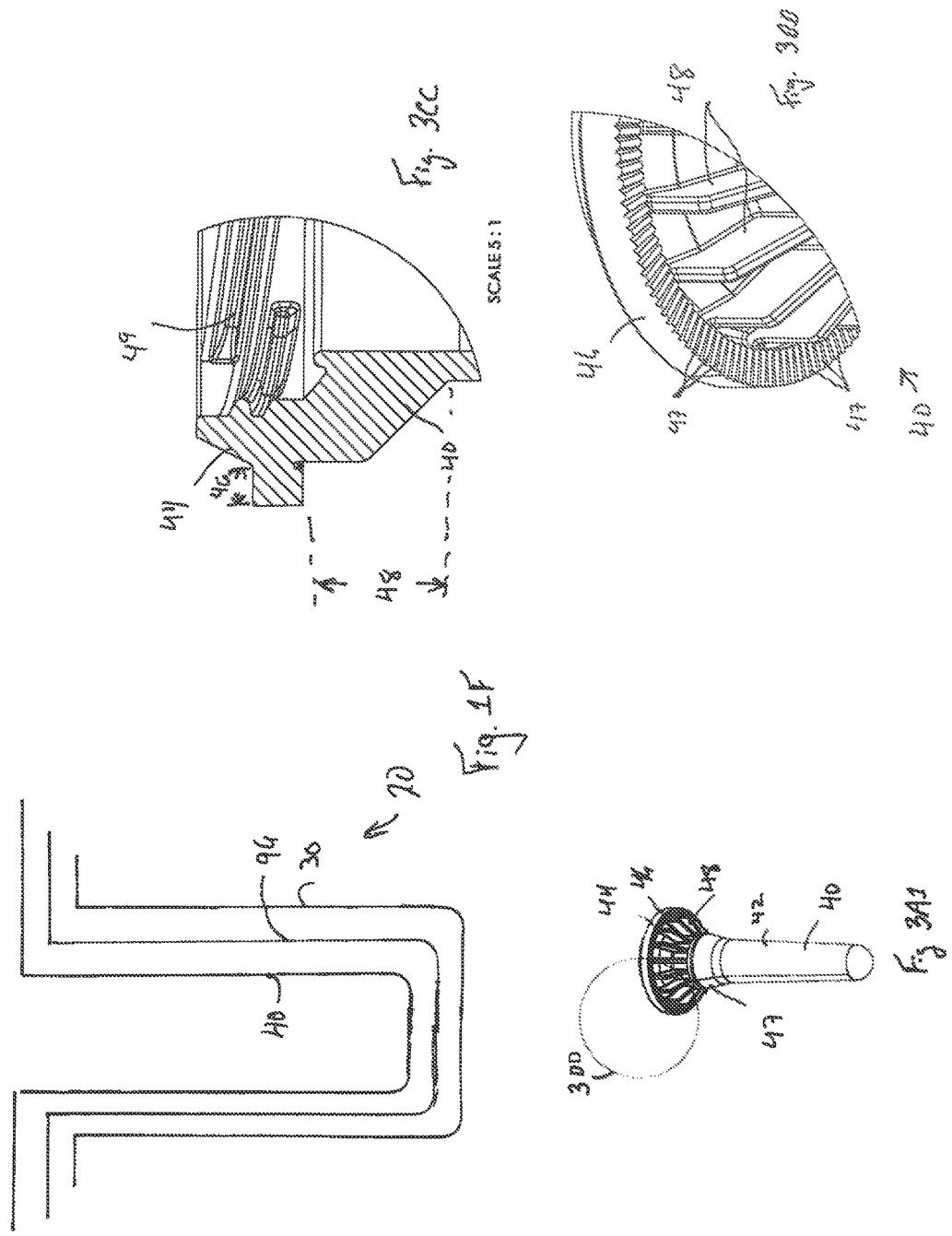

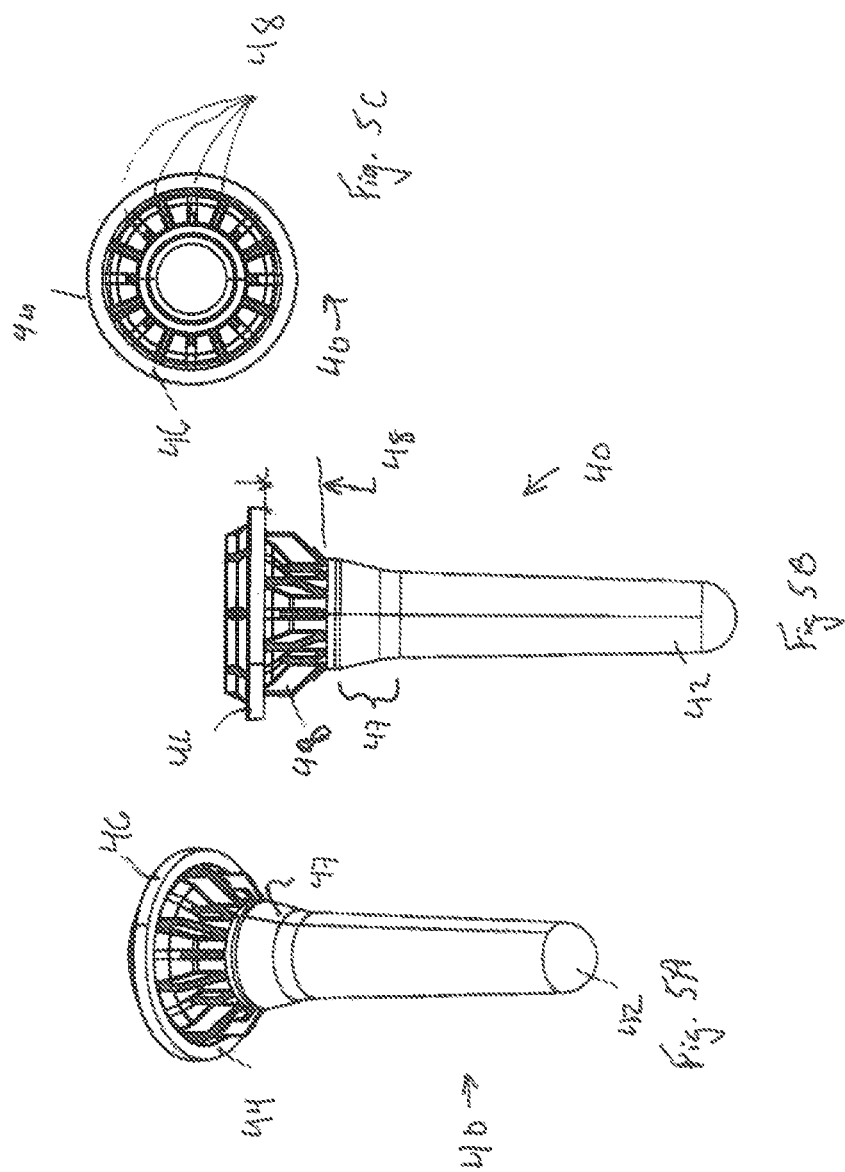

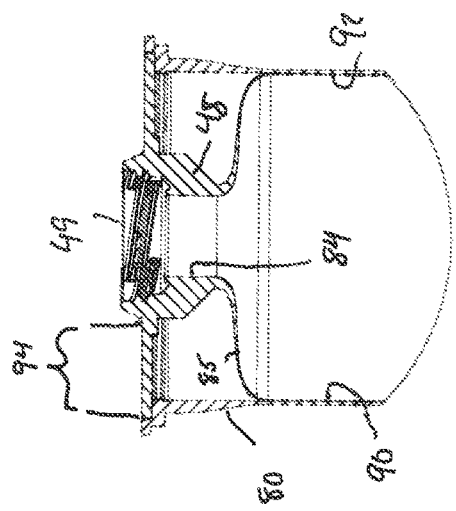
Fig. 6BB
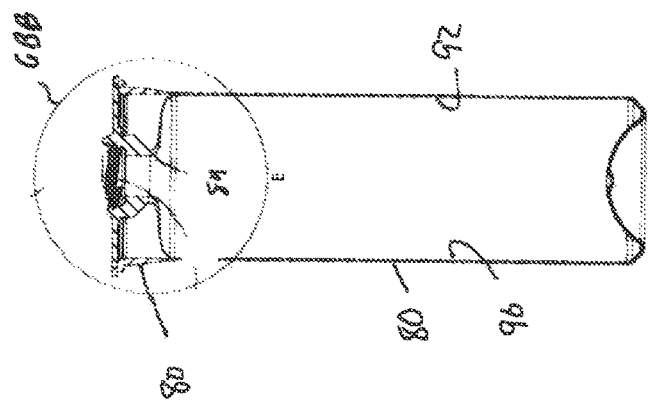
Fig. 6B
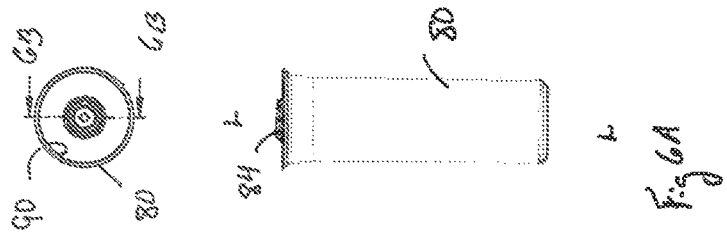
Fig. 6AA
Fig. 6A

PRESSURIZED PLURAL NESTED PREFORM ASSEMBLY AND METHOD OF MANUFACTURE

FIELD OF THE INVENTION

The present invention relates to nested preforms for plastic containers having a propellant charge.

BACKGROUND OF THE INVENTION

Preforms are well known in the art. Preforms are typically injection molded. In a later operation the preform is blow molded to the final shape, often with the assistance of a stretch rod.

Preforms may be nested, so that an inner preform is disposed within an outer preform. This arrangement provides the benefit that both preforms may be blow molded at the same time and in a single operation. A separate operation to insert one preform inside another is necessary.

But the two, or more, preforms are injection molded in separate operations, requiring assembly to nest the preforms for the single blow molding operation. But assembly, in order to nest the preforms, may occur at a first location. The nested preforms may be shipped to a second location, miles away, for warehousing or blow molding. If warehoused, the nested preforms may be subjected to thermal cycling, and likely shipped again for blow molding. In preparation for the blow molding operation, the nested preforms may be run through a tumbler, bulk sorter and/or stacker.

But the shipping, warehousing, tumbling, sorting and/or stacking operations may dislodge and separate the previously nested preforms. If the preforms become separated, re-assembly is necessary, defeating the purpose of nesting. Previous attempts include: 2012/0132607, U.S. Pat. Nos. 6,499,311, 6,649,121, 8,851,322 and 9,162,372. An aerosol container having a bag therein may be made from a dual layer preform, having plural layers disposed one inside the other. Relevant attempts in the art include U.S. Pat. Nos. 3,450,254; 4,330,066; 6,254,820; RE 30093 E; WO 9108099 and US 2011/0248035 A1.

But some of these attempts rely upon blow molding the nested inner and outer preforms into an inner bag and outer container, respectively. A volume is defined between the inner bag and outer container. The volume must be charged with propellant, then sealed, for future use. But the propellant charge is a separate operation which typically occurs after blowmolding.

Blowmolding typically requires two steps, a low pressure step followed by a high pressure step. The two steps of the operation increase time, and thus cost, of the manufacturing process. And the equipment used in the high pressure blowmolding step must be capable of supplying air at 2700 to 3500 kPa. Such an equipment requirement also adds to manufacturing cost.

After blowmolding, the propellant charge occurs. But the propellant charge requires specialized equipment. This equipment may not be conveniently located adjacent with the product fill, requiring further steps or transport between propellant charge and product fill. Furthermore, if rapid production turnaround is needed, it is advantageous to have fewer steps to be completed when the nested preforms are pulled from inventory.

Accordingly this invention is directed to the problem of reducing post-blowmolding manufacturing steps for making bag-in-bottle plastic aerosol containers using nested preforms.

SUMMARY OF THE INVENTION

The invention comprises a plural preform assembly for a container, and method of making. The plural preform assembly has a longitudinal axis defining a longitudinal direction and comprises an outer preform having an outer preform open end and an outer preform closed end longitudinally opposed thereto, an outer preform sidewall joining the outer preform open end and the outer container closed end, the outer preform having an outer preform inner surface and an outer preform outer surface, an inner preform disposed in the outer preform, the inner preform having an inner preform open end and an inner preform closed end longitudinally opposed thereto, an inner preform sidewall joining the inner preform open end and the inner preform closed end, the inner preform having an inner preform inner surface and an inner preform outer surface. The inner preform and the outer preform are sealably joined at the respective open ends, and propellant is disposed intermediate the inner preform and the outer preform. Preferably the propellant is disposed between the inner and outer preforms at a gage pressure greater than atmospheric pressure.

BRIEF DESCRIPTION OF THE DRAWINGS

The drawings are to scale, unless otherwise noted.

FIG. 1A is a perspective view of a plural preform assembly according to the present invention.

FIG. 1AA is a top plan view of the plural preform assembly of FIG. 1A.

FIG. 1B is a side elevational view of the plural preform assembly of FIG. 1A.

FIG. 1C is a vertical sectional view taken along lines 1C-1C of FIG. 1AA.

FIG. 1CC is an enlarged fragmentary view taken from FIG. 1C.

FIG. 1D is a vertical sectional view taken along lines 1D-1D of FIG. 1AA.

FIG. 1DD is an enlarged fragmentary view taken from FIG. 1D.

FIG. 1AE is a partially exploded perspective view of a plural preform assembly according to the present invention.

FIG. 1AAE is a top plan view of the plural preform assembly of FIG. 1AE.

FIG. 1BE is a partially exploded side elevational view of the plural preform assembly of FIG. 1AE.

FIG. 1CE is a vertical sectional view taken along lines 1CE-1CE of FIG. 1AAE.

FIG. 1CCE is an enlarged fragmentary view taken from FIG. 1CE.

FIG. 1DE is a vertical sectional view taken along lines 1DE-1DE of FIG. 1AAE.

FIG. 1F is a schematic vertical sectional view, not drawn to scale, of an exploded plural preform assembly having an intermediate preform.

FIG. 1DDE is an enlarged fragmentary view taken from FIG. 1DE.

FIG. 2A is a perspective view of the outer preform of FIG. 1A, showing four notches not drawn to scale, otherwise FIGS. 2A-2CC being to scale.

FIG. 2AA is a top plan view of the outer preform of FIG. 2A

FIG. 2B is a side elevational view of the outer preform of FIG. 2A.

FIG. 2C is a vertical sectional view taken along lines 2C-2C of FIG. 2AA.

FIG. 2CC is an enlarged fragmentary view taken from FIG. 2C.

FIG. 2D is a schematic bottom view, not drawn to scale of an outer preform having diagonal and radial inwardly extending ribs.

FIGS. 3A1 and 3A2 are perspective views of the inner preform of FIG. 1A.

FIG. 3AA is a top plan view of the inner preform of FIG. 3A1.

FIG. 3AB is a bottom plan view of the inner preform of FIG. 3A1.

FIG. 3B is a side elevational view of the inner preform of FIG. 3A1.

FIG. 3C is a vertical sectional view taken along lines 3C-3C of FIG. 3AA.

FIG. 3CC is an enlarged fragmentary view taken from FIG. 3C.

FIG. 3DD is an enlarged fragmentary view taken from FIG. 3A1.

FIG. 5A is a perspective view of an inner preform having no channels and ribs with plural diameters.

FIG. 5B is a side elevational view of the preform of FIG. 5A.

FIG. 5C is a bottom view of the preform of FIG. 5A, the radial dimensions of the ribs in FIGS. 5A-5C not necessarily being drawn to scale.

FIG. 6A is a side elevational view of an exemplary dispenser according to the present invention.

FIG. 6AA is a top plan view of the inner preform of FIG. 6A.

FIG. 6B is a vertical sectional view taken along lines 6B-6B of FIG. 6AA.

FIG. 6BB is an enlarged fragmentary view taken from FIG. 6B.

DETAILED DESCRIPTION OF THE INVENTION

Figure 4A:
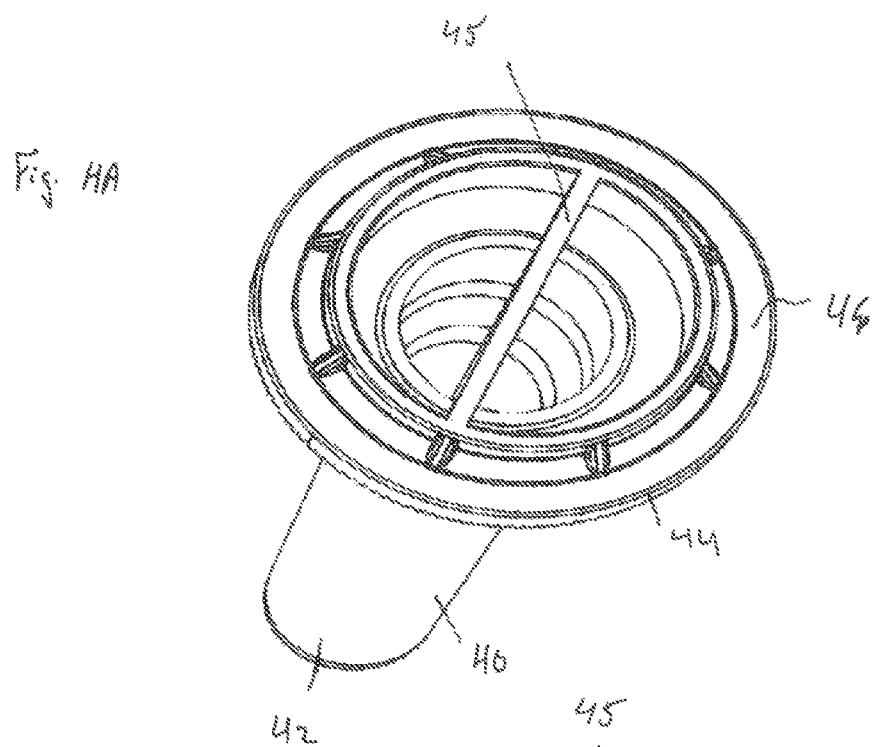
FIG. 4A is a perspective view of an alternative embodiment of an inner preform assembly, having plural internal preforms in parallel with a common septum and no threads.

Referring to FIGS. 1A-1F, the invention comprises a plural preform assembly (20). The plural preform assembly (20) has a plurality of injection molded preforms (30)(40), which are nested together. The plural preform assembly (20) more particularly comprises an outer preform (30) and an inner preform (40) nested therein. Optionally, one or more intermediate preforms (96) may be interposed between the outer preform (30) and inner preform (40). The optional intermediate preforms (96) internal to an outer preform (30) and external to an inner preform (40).

Each preform (30)(40) has a finish (34)(44) and a body (32)(42) depending therefrom. The finish (34)(44) and body (32)(42) may be integral. The finish (34)(44) is generally not affected by subsequent molding operations. The body (32)(42) is generally blown to attenuate wall thickness and increase both length and/or cross sectional area.

Each preform (30)(40), and the container made therefrom, has a closed end which is typically at the bottom of the preform or container. Likewise, each preform (30)(40), and the container made therefrom, has an open end which is typically at the neck (84) of the preform (30)(40) or container.

By nested it is meant that a first preform (40) is inserted into a second preform (30)(96), so that the finishes (34)(44) of the preforms (30)(40) are in mutual contact. The second preform (96) may be nested into a third preform (30), and so on. The first preform (40) may be directly nested into a single outer preform (30), providing a dual preform assembly (20) within the scope of the invention. The body (42) of the first preform (40) may lightly contact or be spaced away from the body (32) of the second preform (30)(96), so that assembly into the nested configuration can easily occur.

Preferably the body of the inner preform (42) and body of the outer preform (32) do not touch throughout the sidewalls and/or bottoms of the respective bodies. By avoiding contact or touching, problems with tolerance stackup are avoided, as are problems with the bodies (32)(42) of the nested inner preform (40) and outer preform (30) melting together upon reheat during subsequent blow molding. If desired a release agent may be applied to improve delamination of the inner preform (40) and outer preform (30) during or after the blow molding process.

Each of the inner preform (40) and outer preform (30) is blow molded into a respective inner container (90) and outer container (80). The inner container (90) is blow molded from the inner preform (40) and may contain product for later dispensing and provide a barrier against propellant. The outer container (80) is blow molded from the outer preform (30), may contain propellant and provide for handling by the user.

Such an outer container (80) may define a longitudinal axis L-L of the aerosol dispenser. The outer container (80) may be axisymmetric as shown, or, may be eccentric. While a round cross-section is shown, the invention is not so limited. The cross-section may be square, elliptical, irregular, etc. Furthermore, the cross section may be generally constant as shown, or may be variable. If a variable cross-section is selected, the outer container (80) may be barrel shaped, hourglass shaped, or monotonically tapered.

The outer container 22 may range from 6 to 60 cm, and particularly 10 to 40 cm in height, taken in the axial direction and from 3 to 60 cm, and particularly 4 to 10 cm in diameter if a round footprint is selected. The outer container 22 may have a volume ranging from 40 to 1000 cc exclusive of any components therein, such as a product delivery device. The outer container 22 may be injection stretch blow molded. If so, the injection stretch blow molding process may provide an overall stretch ratio of greater than 8, 8.5, 9, 9.5, 10, 12, 15 or 20 and less than 50, 40 or 30.

The inner preform (40) may be blow molded to form an inner container (90), particularly a collapsible bag (92). Such a collapsible bag (92) may hold product therein, for subsequent dispensing by a user. The inner container (90), upon blow molding, may have a wall thickness of 0.07 to 0.3 mm, exclusive of any ribs (48) disposed thereon. The bag (92) may comprise two layers including nylon and either EVOH or PET. Or three layers may be utilized, including PET/Nylon/Pet or PET/EVOH/PET. The layers may be co-molded or overmolded. The multi-layer arrangements are believed to provide increased flexibility, increased barrier resistance and reduced pinholing.

Referring to FIGS. 2A-2CC, and examining the outer preform (30) in more detail, the outer preform (30) may have a finish. The finish of the outer preform (34) may be larger in diameter than the body. The finish may be made according to the teachings of U.S. Pat. Nos. 6,019,252; 6,971,530 (particularly FIGS. 4, 5 and 7 thereof), U.S. Pat. Nos. 7,303,087 and 7,028,866.

The finish of the outer preform (34) may have an outer preform collar (36). The collar (36) defines the largest diameter of the outer preform (30), and preferably, but not necessarily, circumscribing, the perimeter of the preform (30). The outer preform collar (36), particularly the inner or upwardly facing surface thereof, provides a seat for attachment of the finish of the inner preform (44) thereto.

If desired, the outer preform finish (34) and/or inner preform finish (44) may have a deformation band therein. The deformation band may provide for plastic deformation of the band upon insertion of the inner preform (40) into the outer preform (30). The ribs (48) may plastically seat into the deformation band, preventing relative rotation between the inner preform (40) and outer preform (30).

The deformation band is a thin layer of material which plastically radially deforms under the radially outward pressure of the ribs (48). Likewise the ribs (48) may plastically deform under resistance from the deformation band. The ribs (48) provide concentrated forces which deform only the respective portions of the band contacted thereby. The deformation band may have reduced diameter relative to the balance of the finish of the outer preform (34).

The body of the outer preform (32) may taper inwardly as the distal end, located at the bottom of the preform, is approached. The body of the outer preform (32) may have a transition zone (37) subjacent or somewhat below the finish. The transition zone (37) may provide for a reduction in diameter, and particularly a monotonic reduction in diameter, between the underside of the finish and the balance of the body. The transition zone (37) may accommodate radially extending ribs (48) on either the inner preform (40) or the outer preform (30).

The collar (36) of the outer preform (30) may have one or more notches (38) therein. The notches (38) may be complementary to the ribs (48) and engage the ribs (48) of the inner preform (40). Such engagement of the ribs (48) and notches (38) may reduce undesired spinning of the inner preform (40) and outer preform (30) relative to each other during the blow molding operation.

One of skill will recognize that the notches (38) may be disposed on the inner preform (40) and ribs (48) disposed on the outer preform (30) in a variation. Or both the inner preform (40) and outer preform (30) may have ribs (48) which engage the other preform. In such an embodiment, either or both preforms may also have complementary notches (38) which engage the other preform.

Referring to FIGS. 3A1-3DD, the finish (44) of the inner preform (40) may optionally be threaded. The threads (49) may be external, or preferably internal, to the preform (40). Internal threads (49) can be used to accept a complementary valve assembly. The valve assembly forms no part of the claimed invention, except as specifically set forth herein.

The inner preform (40) may have an inner preform collar (46). The inner preform collar (46) may be complementary to the outer preform collar (36) of the outer preform (30), so that the inner preform (40) may nest within the outer preform (30).

The inner preform (40) and outer preform (30) are joined together. The inner preform (40) and outer preform (30) may be permanently joined together so that separation of the nested preforms (30)(40) does not occur without unintended damage to either the inner preform (40) or outer preform (30). Alternatively, the inner preform (40) and outer preform (30) may be removably joined together so that the inner preform (40) and outer preform (30) can be separated, but remain nested during ordinary manufacturing, shipping and storage.

Nesting and concomitant joining of the inner preform (40) and outer preform (30) may be accomplished with a friction fit. A friction fit occurs due to radial interference between at least a portion of the inner preform (40) and at least a portion of the outer preform (30). The friction fit causes the inner preform (40) and outer preform (30) to remain in position and nested during subsequent processing, until and through blow molding. Blow molding occurs while the preform (30)(40) are nested, so that a bag in bottle results.

The friction fit may occur between any portion of the inner preform (40) and outer preform (30), particularly between the finish (44) of the inner preform (40) and finish (34) of the outer preform (44). The diametrical radial interference may be less at least 0.05 mm, and less than 1 mm, 0.5 mm and 0.1 mm, with a diametrical fit of 0.6 mm having been found suitable.

A friction fit provides the benefit that a separate material, such as adhesive, is not necessary to maintain the inner preform (40) and outer preform (30) in the nested configuration throughout subsequent processing and blow molding. A friction fit also provides the benefit that a mechanical interlock, such as a bayonet fitting or screw thread is not needed to maintain the nested configuration. A mechanical interlock adds to the injection molding cost and requires a separate operation to index and join the inner preform (40) and outer preform (30). Thus, joining materials and mechanical interlocks may be advantageously avoided and omitted with the present invention, while retaining the advantages of nesting.

The inner preform (40) may optionally have a plurality of, preferably three or more, outwardly extending ribs (48). The ribs (48) provide for concentric alignment of the inner preform (40) and outer preform (30). The ribs (48) also resist unintended distortion/expansion of the inner preform (40) if the plural preform assembly (20) is later pressurized for use as an aerosol dispenser.

The ribs (48) may be complementary to the transition zone (37) of the outer preform (30). Upon longitudinally inserting the inner preform (40) into the outer preform (30), the ribs (48) radially contact and engage the inner surface of the outer preform (30). The ribs (48) may be unequally or preferably equally circumferentially spaced around the circumference of the finish (44), with preferably the ribs (48) have concentric and constant maximum diameter. The preform (40) may have from, 4 ribs (48) to 30 ribs (48), 8 to 24 ribs (48), and particularly from 12 to 20 ribs (48), more particularly 16 ribs (48), equally sized and equally circumferentially spaced.

The ribs (48) may have a radial dimension of 2 to 8 mm, 4 to 6 mm, and particularly 5 mm. The ribs (48) may have a thickness in the circumferential direction of 0.5 to 1.5 mm, particularly 0.8 to 1.2 mm and more particularly 1 mm.

It is desired that the ribs (48) not have excessive thermal mass, so that the ribs (48) do not provide undue heat sink during injection molding and deform or require undue thickness in the mating component. While ribs (48) of constant thickness are shown, one of skill will recognize that the ribs (48) may taper in thickness from the proximal end to the distal end. The taper provides the unexpected benefit of reduced contact area at the position where the ribs (48) contact the outer preform (30). The taper may also provide for some plastic deformation, joining the inner preform (40) and outer preform (30).

In the longitudinal direction, the ribs (48) may taper inwardly, corresponding to the transition of the inner preform (40) and providing for monotonically reduced diameter as the distal end of the inner preform (40) is approached. The taper provides the unexpected benefit of a funnel effect so that the inner preform (40) and outer preform (30) are concentric upon nesting.

If desired, the underside of the inner preform (40) finish and/or the upper side of the outer preform (30) may have channels (47) therethrough. The channels (47) may provide for charging the outer container (80) with propellant and subsequent sealing to maintain pressure. Suitable charging and sealing processes are particularly described in commonly assigned U.S. Pat. No. 8,869,842 to Smith at FIG. 9 and column 8, lines 30-43.

Figure 4B:
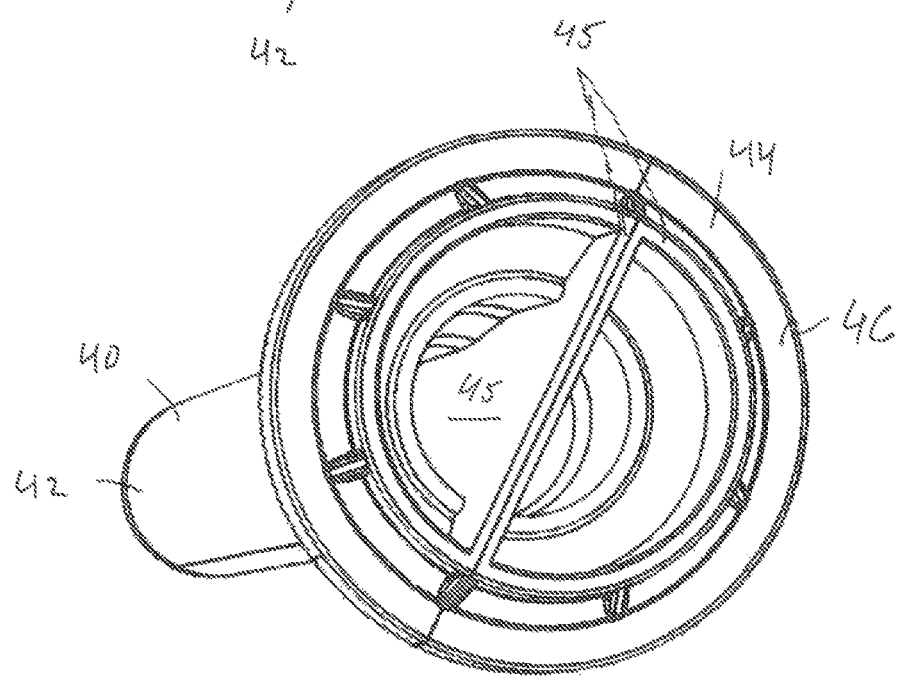
FIG. 4B is a perspective view of an inner preform assembly, having plural internal preforms in parallel with symmetrically opposite preforms in contacting relationship and no threads.

Referring to FIGS. 4A-4B, the plural preform assembly (20) may comprise a single outer preform (30) and two, or more, inner preforms (40) disposed in parallel to comprise an inner preform (40) assembly (20). Such a plural preform assembly (20) may comprise two inner preforms (40) which become respective bags (92) and are separated by a common septum (45). Or, alternatively, the plural preform assembly (20) may comprise two inner preforms (40) which are mirror images of each other and placed in proximate or even contacting relationship to the other.

Each of these inner preforms (40) may hold a unique product which is isolated until dispensed at the point of use. The parallel inner preforms (40) may be equally or unequally sized and shaped, depending upon the relative proportions of products desired to be co-dispensed therefrom. The parallel arrangement provides the benefit that chemically unstable materials are not prematurely mixed, causing loss of efficacy. The products in the separate inner preforms (40) may be dispensed using a common actuator and have separate dedicated valves or a common manifold to a valve. One of skill will recognize that two or more intermediate bags (92) may be coaxially disposed. The intermediate bags (92) may be relatively rigid or relatively flexible.

Referring to FIGS. 5A-5C, an inner preform (40) having ribs (48) of at least two different diameters is shown. A first plurality of the ribs (48) may have a first diameter. A second plurality of ribs (48) may be circumferentially interspersed with or throughout the first plurality of ribs (48) and have a second diameter less than the first diameter. The first diameter is larger than the second diameter. This arrangement provides the benefit that upon nesting, the ribs (48) having the first diameter provide frictional engagement, so that undesired separation of the preforms (30)(40) does not occur. The ribs (48) having the second, and smaller, diameter may not contact the outer preform (30) while the inner preform (40) and outer preform (30) are at ambient pressure. But the ribs (48) of lesser diameter advantageously provide structural support in the axial direction while conserving material. Such structural support can minimize leakage past the valve, due to deformation which occurs under pressurization.

In such an embodiment, the nested inner preform (40) and outer preform (30) are blow molded into a respective nested inner container (90) and outer container (80), the space between the inner container (90) and outer container (80) may be charged with propellant to a positive pressure greater than ambient pressure. The positive pressure may cause radial expansion of the inner preform (40), causing engagement of the ribs (48) having the second smaller diameter with the outer container (80).

Referring to FIG. 2D, the invention has been described with respect to radially outwardly extending ribs (48) disposed on the outer surface of the inner preform (40). One of skill will recognize that instead of, or in addition to such ribs (48) as described above, ribs (48) may also be disposed on the inner surface of the outer preform (30). While the ribs (48) have previously been shown as being identically radially oriented, one of skill will recognize some or all of the ribs (48) may be diagonally oriented relative to the longitudinal axis and or circumference. Likewise, the ribs (48) of the inner preform (40) may be diagonally radially oriented, instead of or in addition to identically radially oriented.

Referring to FIGS. 6A-6BB, dispensers having an inner container (90) and outer container (80) are well known in the art. Aerosol dispensers typically comprise an outer container (80) which acts as a frame for the remaining components and as a pressure vessel for propellant and product contained therein. Relevant attempts in the art to employ plastic in aerosol dispensers are found in U.S. Pat. Nos. 2,863,699; 3,333,743 and 2009/0014679.

The outer container (80) has an open top which defines a neck (84) for receiving additional components of the aerosol dispenser. The industry has generally settled upon a diameter of 2.54 cm, for standardization of components among various manufacturers, although smaller diameters, such as 20 mm, are also used. Typically a valve cup (94) is inserted into the open top. The valve cup (94) is sealed against the neck (84) to prevent the escape of the propellant and loss of pressurization, such as described in commonly assigned U.S. Pat. No. 8,869,842 or as described in U.S. Pat. No. 8,096,327. The valve cup (94) holds the valve components which are movable in relationship to the balance of the aerosol dispenser.

A collapsible, flexible bag (92), blow molded from the inner preform (40) may be sealed to the opening on the underside of the valve cup (94) or may be placed between the valve cup (94) and the container. This bag (92) limits or even prevents intermixing of the contents of the bag (92) and the components outside of the bag (92). Thus, product may be contained in the bag (92). Propellant may be disposed between the outside of the bag (92) and inside of the outer container (80). Upon actuation of the valve, a flow path out of the bag (92) is created. This embodiment is commonly called a bag (92) on valve and may be used, for example, in dispensing shaving cream gels, suntan lotion, hard surface cleaners, body sprays, laundry detergents, air fresheners, astringents, foods, paint, insecticides, perfumes, foaming personal care products such as shampoos and deodorants, etc.

The neck (84) may be connected to the container sidewall by a shoulder (85). The shoulder (85) may more particularly be joined to the sidewall by a radius. The shoulder (85) may have an annular flat. The neck (84) may have a greater thickness at the top of the outer container (80) than at lower portions of the neck (84) to provide a differential thickness. Such differential thickness may be accomplished through having an internally stepped neck (84) thickness.

A valve cup (94) may be sealed to the opening of the outer container (80), as described in further detail below. The valve cup (94) may be sealed to the neck (84) of the outer container (80) using the class 1 TPE material. Polyester based TPE sold by Kraiburg TPE GmbH & Co KG of Waldkraiburg, Germany under the name HTC8791-52 and by DuPont of Delaware under the name HYTEL may be used for good resistance to Silicone and adhesion to PET. Or a styrenic block copolymer based TPE such as Kraiburg HTC8791-24 or Krayton elastomer may be used, providing relatively easy processing and lower density. Other seal materials include silicone, rubber and other conformable materials.

A valve assembly, in turn, may be disposed within the valve cup (94). The valve assembly provides for retention of product within the aerosol dispenser until the product is selectively dispensed by a user. The valve assembly may be selectively actuated by an actuator. A nozzle and related valve assembly components may optionally be included, depending upon the desired dispensing and spray characteristics. The valve assembly may be attached using conventional and known means. The valve assembly and actuator may be conventional and do not form part of the claimed invention.

Selective actuation of the valve assembly allows the user to dispense a desired quantity of the product on demand. Any number of known valve assemblies may be usable with the present invention, with a valve made according to commonly assigned U.S. Pat. No. 9,132,955 being suitable. A suitable plug and sleeve type valve assembly may be made according to the teachings of commonly assigned U.S. Pat. No. 8,511,522.

The aerosol dispenser, and components thereof, may have a longitudinal axis, and may optionally be axi-symmetric with a constant round cross section. Alternatively, the outer container (80), collapsible bag (92), etc., may be eccentric and/or may have a square, elliptical or other constant or variable cross section.

The outer container (80) may comprise a plastic pressurizeable container. The plastic may be polymeric, and particularly comprise PET. The valve assembly, and optional valve cup (94) may be joined to the neck (84) of the outer container (80) in known fashion.

The pressurizeable container may further include a propellant. The propellant may comprise nitrogen, air and mixtures thereof. Propellant listed in the US Federal Register 49 CFR 1.73.115, Class 2, Division 2.1 and 2.2 are also considered acceptable. The propellant may particularly comprise a Trans-1,3,3,3-tetrafluoroprop-1-ene, and optionally a CAS number 1645-83-6 gas. One such propellant is commercially available from Honeywell International of Morristown, N.J. under the trade name HFO-1234ze or SOLSTICE.

If desired, the outer container (80), valve cup (94), valve assembly, and/or piston may be polymeric. By polymeric it is meant that the component is formed of a material which is plastic, comprises polymers, and/or particularly polyolefin, polyester or nylons, and more particularly PET. Thus, the entire aerosol dispenser or, specific components thereof, may be free of metal, allowing microwaving. Microwave heating of the aerosol dispenser or pressurizable container therefor provides for heating of the product prior to dispensing. Heating of the product prior to dispensing may be desirable if the product is applied to the skin, becomes more efficacious at lower viscosities, or is to be eaten.

The outer container (80), and all other components, except the TPE seal, may comprise, consist essentially of or consist of PET, PEN, Nylon, EVOH or blends thereof to meet DOT SP 14223. Such materials may be selected from a single class of recyclable materials, as set forth above by the SPI and as described in commonly assigned U.S. Pat. No. 9,296,550.

The valve cup (94) may have a valve cup (94) periphery complementary to the neck (84) periphery. At least one of the valve cup (94) and/or container neck (84) may have one or more channels (47) therethrough. Additionally or alternatively, the channels (47) may be formed at the interface between the valve cup (94) and container neck (84). Particularly, the bottom edge of the upper container portion and top edge of the lower container portion are complementary to the other. The channels (47) may be formed by irregularities, such as crenulations, merlins, serrations, notches (38), teeth, etc. between and on the bottom edge of the upper container portion and/or top edge of the lower container portion.

In manufacture, after the inner and outer preforms (30) are blow molded into a functionable dispenser, a manifold may supply propellant, under pressure, through at least one channel between the upper container portion and lower container portion. The manifold may be retractingly disposed above the outer container (80). The manifold may be brought into contact with the valve cup (94), forming a temporary seal therebetween. Suitable channels (47) are particularly described in commonly assigned U.S. Pat. No. 8,869,842 to Smith at FIG. 8, column 7, lines 57 to column 8, line 2 and column 8, lines 44-60.

While the temporary seal is established between the manifold and valve cup (94), the propellant may be charged into the upper container portion and/or lower container portion. A suitable process for charging the outer container (80) with propellant is described in commonly assigned U.S. Pat. No. 8,869,842 to Smith at FIG. 9 and column 8, lines 15-35.

At 21 degrees C., the outer container (80) may be pressurized to an internal gage pressure of 100 to 1300, 110 to 490 or 270 to 420 kPa. A particular aerosol dispenser may have an initial propellant pressure of 1100 kPA and a final propellant pressure of 120 kPa, an initial propellant pressure of 900 kPA and a final propellant pressure of 300 kPa, an initial propellant pressure of 500 kPA and a final propellant pressure of 0 kPa, etc.

If desired, the propellant 40 may be condensable. Generally, the highest pressure occurs after the aerosol dispenser 20 is charged with product 42 but before the first dispensing of that product 42 by the user. A condensable propellant 40, when condensed, provides the benefit of a flatter depressurization curve at the vapor pressure, as product 42 is depleted during usage. A condensable propellant 40 also provides the benefit that a greater volume of gas may be placed into the container at a given pressure. A condensable propellant 40, such as HFO-1234ze, may be charged to a gage pressure of 100-400 kPa at 21 degrees C.

One of skill will recognize the plural preform assembly (20) of the invention may be used with trigger pump sprayers or finger pump sprayers, if an aerosol container is not desired. In a variant embodiment, a non-aerosol system using an elastically deformable band may be used, as described in commonly assigned U.S. Pat. No. 8,631,970.

Combinations

A. A plural preform assembly (20) for a container, said plural preform assembly (20) having a longitudinal axis defining a longitudinal direction, said plural preform assembly (20) comprising: an outer preform (30) having an outer preform (30) open end and an outer preform (30) closed end longitudinally opposed thereto, an outer preform (30) sidewall joining said outer preform (30) open end and said outer container (80) closed end, said outer preform (30) having an outer preform (30) inner surface and an outer preform (30) outer surface, and an inner preform (40) disposed in said outer preform (30), said inner preform (40) having an inner preform (40) open end and an inner preform (40) closed end longitudinally opposed thereto, an inner preform (40) sidewall joining said inner preform (40) open end and said inner preform (40) closed end, said inner preform (40) having an inner preform (40) inner surface and an inner preform (40) outer surface, said inner preform (40) and said outer preform (30) being sealably joined at said respective open ends and containing propellant therein, optionally at a gage pressure greater than atmospheric pressure.

B. A plural preform assembly for an aerosol container, said plural preform assembly having a longitudinal axis defining a longitudinal direction, said plural preform assembly comprising:

an outer preform having an outer preform neck with an open end and an outer preform closed end longitudinally opposed thereto, an outer preform sidewall joining said outer preform open end and said outer preform closed end, said outer preform having an outer preform inner surface and an outer preform outer surface, and an inner preform disposed in said outer container, said inner preform having an inner preform neck with an open end and an inner preform closed end longitudinally opposed thereto, an inner preform sidewall joining said inner preform open end and said inner preform closed end, said inner preform having an inner preform inner surface and an inner preform outer surface, said inner preform and said outer preform being sealably joined at said respective necks and not touching the other at said respective sidewalls or respective closed ends, and defining a volume of not more than 50 ml between said inner preform and said outer preform, and propellant disposed in said volume, preferably at a pressure greater than atmospheric pressure.

C. A method of making a plural preform assembly for a bag in bottle, said method comprising the steps of:
  a. providing a plural preform assembly for container, said plural preform assembly having a longitudinal axis defining a longitudinal direction, said plural preform assembly having an outer preform having an outer preform open end and an outer preform closed end longitudinally opposed thereto, an outer preform sidewall joining said outer preform open end and said outer preform closed end, said outer preform having an outer preform inner surface and an outer preform outer surface, and an inner preform disposed in said outer container, said inner preform having an inner preform open neck and an inner preform closed end longitudinally opposed thereto, an inner preform sidewall joining said inner preform open end and said inner preform closed end, said inner preform having an inner preform inner surface and an inner preform outer surface, said inner preform being disposed within said outer preform to defines a volume therebetween,
  b. charging said volume with propellant so that said propellant is at a pressure greater than atmospheric pressure, and
  c. sealably joining said inner preform and said outer preform so that said propellant is contained in said volume, wherein said steps a, b and c are performed in sequence.

D. A plural preform assembly for a container according to paragraphs A and B further comprising an intermediate preform disposed between said inner preform and said outer preform.

E. A plural preform assembly for a container according to paragraphs A, B and D further comprising at least one of circumferentially spaced apart ribs disposed on said inner preform and extending radially outwardly to contact said outer preform and circumferentially spaced apart ribs disposed on said outer preform and extending radially inwardly to contact said inner preform.

F. A plural preform assembly for a container according to paragraphs A, B, D, and E wherein said propellant disposed in said space has a pressure of 10 to 55 psig.

G. A plural preform assembly according to paragraphs A, B, D, E and F comprising 10 to 24 equally circumferentially spaced ribs.

H. A plural preform assembly according to paragraphs A, B, D, E, F and G comprising 4 to 10 equally circumferentially spaced ribs.

I. A plural preform assembly according to paragraphs A, B, D, E, F, G and H wherein at least a portion of said ribs extends radially outwardly a distance of 4 to 6 mm.

J. A plural preform assembly according to paragraphs A, B, D, E, F, G, H and I wherein said ribs taper inwardly toward said bottom of said inner preform.

K. A plural preform assembly according to paragraphs A, B, D, E, F, G, H, I and J further comprising a first plurality and second plurality of ribs on one of said inner preform and said outer preform, each of said ribs of said first plurality and said second plurality radially extending towards the other preform, said ribs of said first plurality radially extending a greater distance than said ribs of said second plurality.

L. A plural preform assembly according to paragraphs A, B, D, E, F, G, H, I, J and K further comprising circumferentially spaced apart notches disposed on said outer preform and being complementary to said ribs of said inner preform whereby said ribs can engage said notches when said inner preform and said outer preform are nested.

M. A plural preform assembly according to paragraphs A, B, D, E, F, G, H, I, J, K and L further comprising ribs on one of said inner preform and said outer preform, said ribs radially extending towards the other, and further comprising complementary notches on the other of said outer preform and said inner preform, said ribs intercepting said notches when said inner preform and said outer preform are removably joined together.

N. A plural preform assembly according to paragraphs A, B, D, E, F, G, H, I, J, K, L and M comprising an equal number of ribs and notches.

O. A plural preform assembly according to paragraphs A, B, D, E, F, G, H, I, J, K, L, M and N wherein said inner preform further comprises an outwardly extending collar juxtaposed with said inner preform open neck and further comprising circumferentially spaced apart ribs extending outwards from said inner preform outer surface, said ribs intercepting said collar.

P. A plural preform assembly according to paragraphs A, B, D, E, F, G, H, I, J, K, L, L M, N and O wherein said ribs have a free end longitudinally distal from said collar, said ribs subtending a collar diameter at said collar and a free end diameter at a free ends, said collar diameter being greater than said free end diameter.

Q. A plural preform assembly according to paragraphs A, B, D, E, F, G, H, I, J, K, L, L M, N, O and P and comprising ribs on said inner preform radially extending outwardly towards said outer preform and comprising ribs on said outer preform radially extending towards said inner preform.

R. A method according to paragraph C further comprising the step of:
  d. blowmolding said plural preform assembly while said inner preform is substantially disposed in said outer preform to form a bag in bottle assembly having a collapsible blown bag within an outer container, wherein said step d is performed after step c.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" and a pressure disclosed as "about 1100 kPa" is intended to include 1103.2 kPa.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range. That is the upper limit of one range may be used with the lower limit of another range, and vice versa.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of making a plural preform assembly for a bag in bottle, said method comprising the steps of:
   a. providing a plural preform assembly, said plural preform assembly having a longitudinal axis defining a longitudinal direction, said plural preform assembly having an outer preform having an outer preform open end and an outer preform closed end longitudinally opposed thereto, an outer preform sidewall joining said outer preform open end and said outer preform closed end, said outer preform having an outer preform inner surface and an outer preform outer surface, and an inner preform disposed in said outer preform, said inner preform having an inner preform open neck and an inner preform closed end longitudinally opposed thereto, an inner preform sidewall joining said inner preform open end and said inner preform closed end, said inner preform having an inner preform inner surface and an inner preform outer surface, said inner preform being disposed within said outer preform to define a volume therebetween,
   b. charging said volume with propellant so that said propellant is at a pressure greater than atmospheric pressure, and
   c. sealably joining said inner preform and said outer preform so that said propellant is contained in said volume, wherein said steps a, b and c are performed in sequence.

2. A method according to claim 1 further comprising the step of:
   d. blowmolding said plural preform assembly while said inner preform is substantially disposed in said outer preform to form a bag in bottle assembly having a collapsible blown bag within an outer container, wherein said step d is performed after step c.

3. A plural preform assembly for a container, said plural preform assembly having a longitudinal axis defining a longitudinal direction, said plural preform assembly comprising:
   an outer preform having an outer preform open end and an outer preform closed end longitudinally opposed thereto, an outer preform sidewall joining said outer preform open end and said outer container closed end, said outer preform having an outer preform inner surface and an outer preform outer surface,
   an inner preform disposed in said outer preform, said inner preform having an inner preform open end and an inner preform closed end longitudinally opposed thereto, an inner preform sidewall joining said inner preform open end and said inner preform closed end, said inner preform having an inner preform inner surface and an inner preform outer surface,
   said inner preform and said outer preform being sealably joined at said respective open ends,
   an intermediate preform disposed between said inner preform and said outer preform; and
   propellant disposed intermediate said inner preform and said outer preform.

4. A plural preform assembly for an aerosol container, said plural preform assembly having a longitudinal axis defining a longitudinal direction, said plural preform assembly comprising:
   an outer preform having an outer preform neck with an open end and an outer preform closed end longitudinally opposed thereto, an outer preform sidewall joining said outer preform open end and said outer preform closed end, said outer preform having an outer preform inner surface and an outer preform outer surface,
   an inner preform disposed in said outer container, said inner preform having an inner preform neck with an open end and an inner preform closed end longitudinally opposed thereto, an inner preform sidewall joining said inner preform open end and said inner preform closed end, said inner preform having an inner preform inner surface and an inner preform outer surface, and
   ribs on one of said inner preform and said outer preform, said ribs radially extending towards the other, and further comprising complementary notches on the other of said outer preform and said inner preform, said ribs intercepting said notches when said inner preform and said outer preform are removably joined together,
   said inner preform and said outer preform being sealably joined at said respective necks and not touching the other at said respective sidewalls or respective closed ends, and defining a volume of not more than 50 ml between said inner preform and said outer preform, and propellant disposed in said volume.

5. A plural preform assembly for a container according to claim 3 further comprising at least one of circumferentially spaced apart ribs disposed on said inner preform and extending radially outwardly to contact said outer preform and circumferentially spaced apart ribs disposed on said outer preform and extending radially inwardly to contact said inner preform.

6. A plural preform assembly for a container according to claim 3 wherein said propellant disposed in said space has a pressure of 10 to 55 psig.

7. A plural preform assembly according to claim 5 comprising 10 to 24 equally circumferentially spaced ribs.

8. A plural preform assembly according to claim 6 comprising 4 to 10 equally circumferentially spaced ribs.

9. A plural preform assembly according to claim 7 wherein at least a portion of said ribs extends radially outwardly a distance of 4 to 6 mm.

10. A plural preform assembly according to claim 9 wherein said ribs taper inwardly toward said bottom of said inner preform.

11. A plural preform assembly according to claim 3 further comprising a first plurality and second plurality of ribs on one of said inner preform and said outer preform, each of said ribs of said first plurality and said second plurality radially extending towards the other preform, said ribs of said first plurality radially extending a greater distance than said ribs of said second plurality.

12. A plural preform assembly according to claim 5 further comprising circumferentially spaced apart notches disposed on said outer preform and being complementary to said ribs of said inner preform whereby said ribs can engage said notches when said inner preform and said outer preform are nested.

13. A plural preform assembly according to claim 4 comprising an equal number of ribs and notches.

14. A plural preform assembly according to claim 4 wherein said inner preform further comprises an outwardly extending collar juxtaposed with said inner preform open neck and further comprising circumferentially spaced apart ribs extending outwards from said inner preform outer surface, said ribs intercepting said collar.

15. A plural preform assembly according to claim 14 wherein said ribs have a free end longitudinally distal from said collar, said ribs subtending a collar diameter at said collar and a free end diameter at a free ends, said collar diameter being greater than said free end diameter.

16. A plural preform assembly according to claim 4 comprising ribs on said inner preform radially extending outwardly towards said outer preform and comprising ribs on said outer preform radially extending towards said inner preform.

* * * * *